(12) United States Patent
Blomgren et al.

(10) Patent No.: US 7,189,049 B1
(45) Date of Patent: Mar. 13, 2007

(54) ROBOT UNIT

(75) Inventors: Stefan Blomgren, Trollhättan (SE); Ingemar Pettersson, Vänersborg (SE)

(73) Assignee: Binar Aktiebolag (publ), Trollhattan (SE)

(*) Notice: Subject to any disclaimer, the term of this patent is extended or adjusted under 35 U.S.C. 154(b) by 0 days.

(21) Appl. No.: 10/030,419

(22) PCT Filed: Jul. 5, 2000

(86) PCT No.: PCT/SE00/01425

§ 371 (c)(1),
(2), (4) Date: Jan. 10, 2002

(87) PCT Pub. No.: WO01/03891

PCT Pub. Date: Jan. 18, 2001

(30) Foreign Application Priority Data

Jul. 13, 1999 (SE) .................................. 9902690

(51) Int. Cl.
*B65G 1/133* (2006.01)

(52) U.S. Cl. .................. 414/751.1; 414/226.01; 414/591; 414/752.1; 198/468.2; 198/750.11; 198/750.12; 198/750.13; 901/3; 901/16; 901/17

(58) Field of Classification Search .......... 414/226.01, 414/591, 749.1, 749.5, 751.1, 751.2, 752.1; 901/3, 16, 17, 21, 26; 198/468.2, 468.4, 198/468.5, 468.6, 750.11, 750.12, 750.13
See application file for complete search history.

(56) References Cited

U.S. PATENT DOCUMENTS 3,805,943 A * 4/1974 Warren ........................ 198/412

(Continued)

FOREIGN PATENT DOCUMENTS

WO WO 96/37346 * 11/1996

*Primary Examiner*—Eileen D. Lillis
*Assistant Examiner*—Michael Lowe
(74) *Attorney, Agent, or Firm*—Michael Bednarek; Paul, Hastings, Janofsky & Walker LLP

(57) ABSTRACT

The present invention relates to a method for rapid transfer of a work object in both the horizontal and vertical directions using a robot unit (10) having a gripping mechanism (12) preferably from one workstation (3) to another (4), the work piece (2) weighing between one kilo and forty kilos and the transfer in the horizontal direction being at least one meter but less than ten meters and at least partially being effected along an essentially horizontally extending beam unit (20), and the gripping mechanism (12) being arranged in such a way that, at least in one end situation (E1) along the beam (20), it can collect and/or deliver a work object (2) in a position (E2) situated beyond the end situation (E1) along the said horizontal beam (20), which robot unit is controlled by means of a control unit (50) and is driven by means of a belt member (24) and at least two motors (26, 27) comprising rotor units connected to drive wheels (26A, 27A) for the said belt member (24), the said motors (26, 27) being immovably arranged in relation to the said workstations (3, 4) and the transfer of the work object (2) being effected without displacement of either of the said two motors (26, 27), characterized in that the whole of the transfer is executed along one and the same beam unit (20), in that the said belt member (24) is constituted by a single continuous drive belt (24), which, at the same time, is connected to and driven by the said drive wheels (26A, 27A), and by the displacement of the work object being guided along a pre-programmed path by means of a control computer (51) in the control unit (50) through the continuous control and registration of the situation of each of the rotors forming part of the said motors (26, 27).

13 Claims, 12 Drawing Sheets

U.S. PATENT DOCUMENTS

| | | | |
|---|---|---|---|
| 3,958,740 A * | 5/1976 | Dixon .................. | 228/102 |
| 4,293,011 A * | 10/1981 | White et al. .............. | 144/4.2 |
| 4,509,638 A * | 4/1985 | Kato et al. .............. | 198/468.4 |
| 4,511,985 A * | 4/1985 | Inaba et al. ............... | 700/251 |
| 4,921,387 A * | 5/1990 | Bennington ............. | 414/779 |
| 4,941,793 A * | 7/1990 | Shiraishi et al. .......... | 198/458 |
| 5,148,697 A * | 9/1992 | Shiraishi et al. .......... | 72/405.1 |
| 5,445,282 A * | 8/1995 | Erikkila .................. | 212/312 |
| 5,476,358 A * | 12/1995 | Costa .................... | 414/749.1 |
| 5,483,876 A * | 1/1996 | Davis et al. ............. | 100/207 |
| 5,520,502 A * | 5/1996 | Liljengren et al. ....... | 414/751.1 |
| 5,632,588 A | 5/1997 | Crorey et al. ............ | 414/225 |
| 6,379,103 B1 * | 4/2002 | Okugi .................... | 414/627 |
| 6,626,630 B1 * | 9/2003 | Lomerson et al. ....... | 414/749.1 |

\* cited by examiner

ROBOT UNIT

TECHNICAL FIELD

The present invention relates to a method for rapid transfer of a work object in both the horizontal and vertical directions using a robot unit having a gripping mechanism preferably from one workstation to another, the work piece weighing between one kilo and forty kilos and the transfer in the horizontal direction being at least one meter but less than ten meters and at least partially being effected along an essentially horizontally extending beam unit, and the gripping mechanism being arranged in such a way that, at least in one end situation along the beam, it can collect and/or deliver a work object in a position situated beyond the end situation along the said horizontal beam, which robot unit is controlled by means of a control unit and is driven by means of at least two motors comprising rotor units

PRIOR ART

Nowadays, various types of robots are commonly used within industry to transfer work pieces from one workstation to another. A typical example is found within pressing lines of the automotive industry, where panels are transferred step by step from one pressing unit to another so as to be successively worked into their final form. The tempo in such a pressing line has risen increasingly over time, with a view to raising productivity. There has long been a general ambition to raise the tempo, i.e. the throughput speed, in such work lines in order to improve profitability. A time-consuming and limiting factor in this is the actual displacement between work units. Contemporary robots are relatively heavy, which means that the maximum transfer speed is limited, since the weight intrinsically produces a certain inertia and the energy consumption is proportional to the product of the weight and the transfer speed. Attempts have been made with advanced systems to trim the transfer speeds as much as possible, but it is in principle economically unviable to attempt to reach speeds of more than six to seven meters per second. A primary reason is that contemporary robots are arranged with servo-motors which play a part in the actual movement. Thus the motors themselves, with gears and cable train, add weight to the object of transfer, thereby giving rise to a vicious circle, since a more rapid transfer calls for a stronger and hence heavier motor, gearing and cable train. At the same time, the cost is obviously increased, which also has a limiting effect.

Many applications also involve relatively large transfers, sometimes up to ten meters, which means that the robot unit needs to be moved a long distance along a beam unit. Often it is relatively heavy work pieces, perhaps up to 40 kilos, which are to be transferred. It will be realized, therefore, that the beam unit which is to support the robot unit in the transfer between the one workstation and the other has to meet high requirements and that the cost is proportional to the weight of the robot unit. There are therefore a number of drawbacks which can be attached to the heavy configuration of present-day robots. It is additionally the case with many applications that the robot has to be able to collect/deliver at a point located beyond the end point of the said horizontal beam unit, which places further demands upon the configuration of the robot so as to be capable of performing the transfer with the precision required.

Attempts have been made to apply other robot principles, but no working alternative has hitherto been produced in relation to known robot systems, probably due to difficulties in meeting the complex requirements which exist in connection with the above-mentioned transfer. By way of example, reference can be made to EP 180 050, which relates to a method using a robot unit having a gripping mechanism to rapidly transfer a work object in both the horizontal and vertical directions, preferably from one workstation to another, the work piece weighing between one kilo and fourteen kilos and the transfer in the horizontal direction being at least one meter but less than ten meters and at least partially being effected along an essentially horizontally extending beam unit, and the gripping mechanism being arranged in such a way that, at least in one end situation along the beam, it can collect and/or deliver a work object in a position located beyond the end situation along the said horizontal beam, which robot unit is controlled by means of a control unit and is driven by means of a belt member and at least two motors comprising rotor units connected to drive wheels for the said belt members, the said motors being immovably arranged in relation to the said workstations and the transfer of the work object being effected without displacement of either of the said two motors. The device known by virtue of EP 180 050 does however have a number of drawbacks. Firstly, it uses two different drive belts to move the slide and the vertical beam respectively. A first drive motor is arranged to drive the belt for horizontal movement of the slide and a second drive motor is arranged to drive a drive wheel via a hollow shaft, which drive wheel, in turn, drives the belt in order to move the beam in the vertical direction. Secondly, in the device according to EP 180 050, two parallel beam units are used to realize a transfer from one workstation to another workstation. A first robot unit transfer the work object from a first pressing unit to an intermediate store and a second robot unit then moves the object from the intermediate store to the second pressing unit. It will be realized that the use of multiple units entails a number of considerable drawbacks, inter alia from the cost aspect, the maintenance aspect and the synchronization aspect.

BRIEF DESCRIPTION OF THE INVENTION

The object of the present invention is to produce a robot system which eliminates or at least minimizes the above-mentioned drawbacks. This is achieved by the whole of the transfer being executed along one and the same beam unit, by the said belt member being constituted by a single continuous drive belt, which, at the same time, is connected to and driven by the said drive wheels, and by the transfer of the work object being guided along a pre-programmed path by means of a control computer in the control unit through the continuous control and registration of the situation of each of the rotors forming part of the said motors.

Though it is previously known to attempt to use "Cartesian type" robots, as they are known, using stationary motors which are not therefore involved in the actual displacement, no break-through or progress has been made with these previously known attempts, especially not with regard to pressing lines. By virtue of EP 310481, for example, such a robot device is previously known, comprising a slide which is arranged moveable along the said beam unit, a second beam unit which extends essentially perpendicular to the first said beam unit and is arranged moveably on the said slide, a gripping mechanism arranged on the one end of the said second beam unit, two drive motors, which are connected to a control unit, a number of deflection rollers, and a drive belt, which runs around the drive wheels of the said drive motors and the said deflection rollers.

A similar device is also shown in DE G 9417837.2. None of these known devices demonstrate the facility, however, to use such a robot design to pick in a position beyond the horizontal beam and, above all, they provide no indication of how any flexible picking/collect be integrated, in which picking/collection will take place beyond the end points for the said beam unit. Over and above this, such a robot unit would probably be very expensive to produce if just as high precision requirements (often repeatability of ca. 0.05 mm) were placed upon such a robot unit as upon previously known, normally used robot devices. The combination of the latter deficiencies is probably the reason why robot principles of this type have yet to find their way onto the market, into work lines of this type, such as, for example, pressing lines.

It has been shown that there are major advantages to be gained if a combination according to the invention is used. Owing to the use of a robot principle without jointly moving motors, speeds of up to and perhaps above ten meters per second can be used, which drastically raises the production capacity in a work line. Moreover, the motors work together, which means that the size (output) of the motors and gears can be halved compared with the traditional solution having a separate motor for each shaft. By using a so called "auto teach-in" process, for calibrating the displacement of the robot, the precision in the design of the robot can to a certain extent be waived, especially with respect to wear and tear and elongations which occur after a certain period of use. A repeating accuracy superior to ca. 0.05 mm is extremely seldom necessary and very often a repeatable accuracy of ca. 1 mm obtains in the majority of work lines for presses. By automatically re-programming/calibrating the system at regular intervals, the required displacement precision is able to be maintained, owing to the fact that the "auto teach-in" system, as it is known, is quick and easy to put into practice. Recurrent calibrations do not therefore create a problem, either in terms of production or in terms of cost. The fact that the precision does not need to be exaggerated but can be kept at a reasonable level allows the robot to be produced at very reasonable cost, not least since used materials and production methods for its production can be kept within a standard concept.

Further advantages and aspects of the invention will be evident from the detailed description below.

DESCRIPTION OF THE FIGURES

The invention will be described in greater detail below with reference to the appended figures, in which.

DETAILED DESCRIPTION

Figure 1:
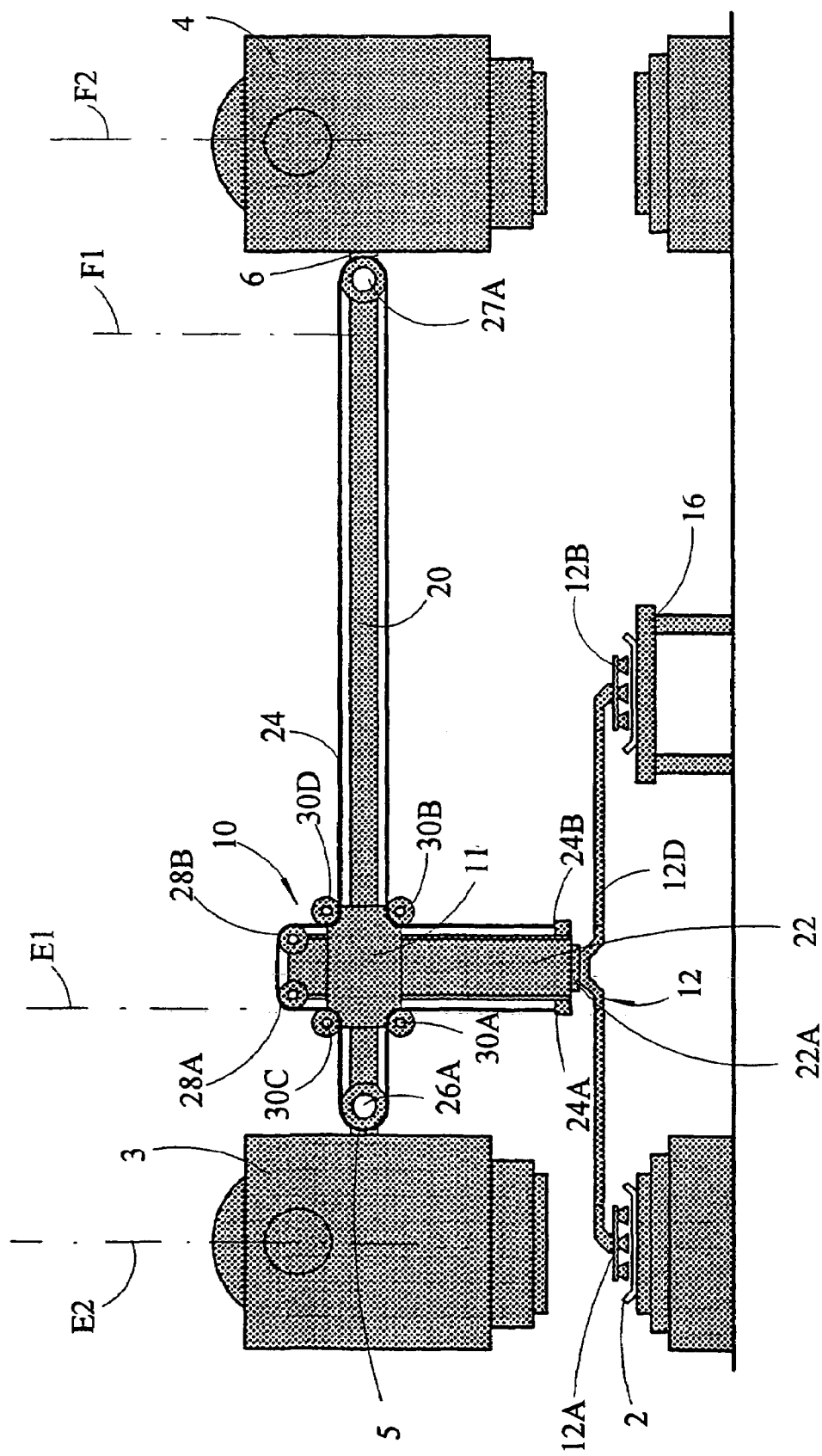
FIG. 1 shows a robot according to the invention installed between two workstations in connection with the collection of a work piece from a workstation.

FIG. 1 shows a pressing line having a robot 10 according to the invention for transfering/picking panel pieces 2 from one pressing unit 3 to another 4. The robot 10 is arranged with a gripping mechanism 12 comprising an elongated unit 12D, at the ends of which there are arranged two gripping mechanism units 12A, 12B, which can use their one gripping unit 12A to pick a panel 2 from the first press 3 and can use the second gripping unit 12B to place the panel in the second press 4. An intermediate table 16 is used in a known manner for intermediate storage of the panel 2 when switching from the one gripping unit 12A to the other 12B.

The robot comprises a horizontal, fixed column/beam 20, which is fastened to each pressing unit 3,4 by means of flexible members 5, 6. These flexible fastening members 5, 6 are essential in, for example, the pressing line in order to eliminate powerful vibrations which may arise in a pressing unit. On the beam 20 there is arranged a horizontally moveable slide 11. A vertically movable column/beam 22 is arranged, in turn, on the slide 11. A flexible belt 24 is used to move the slide 11 and the vertical beam 22. The belt 24 is driven by two motors 26, 27 (see FIG. 2) by means of drive wheels 26A, 27BA and runs around two outer belt deflection rollers 28A, B.

The belt 24 is fastened by its ends 24A, 24B in the lower end of the vertical column 22. Driving of the motors 26, 27 and hence of the belt 24 allows the gripping mechanism 12 to be moved in all X/Y directions. Through the choice of drive direction and speed of the respective motor, the motion of the gripping mechanism 12 is able to be directed in a controlled manner. If the motors rotate in opposite directions and at the same speed, for example, the gripping mechanism will be displaced only in the vertical direction. If, at the same time, a certain speed differential exists between the motors, then a certain horizontal displacement will be effected between the motors. If, on the other hand, the motors rotate in the same direction and at the same speed, a purely horizontal displacement takes place. Through precise computer control of the rotor units 26C, 27C of the motors, precise transfer patterns, freely in space, can thus easily be obtained.

Figure 2:
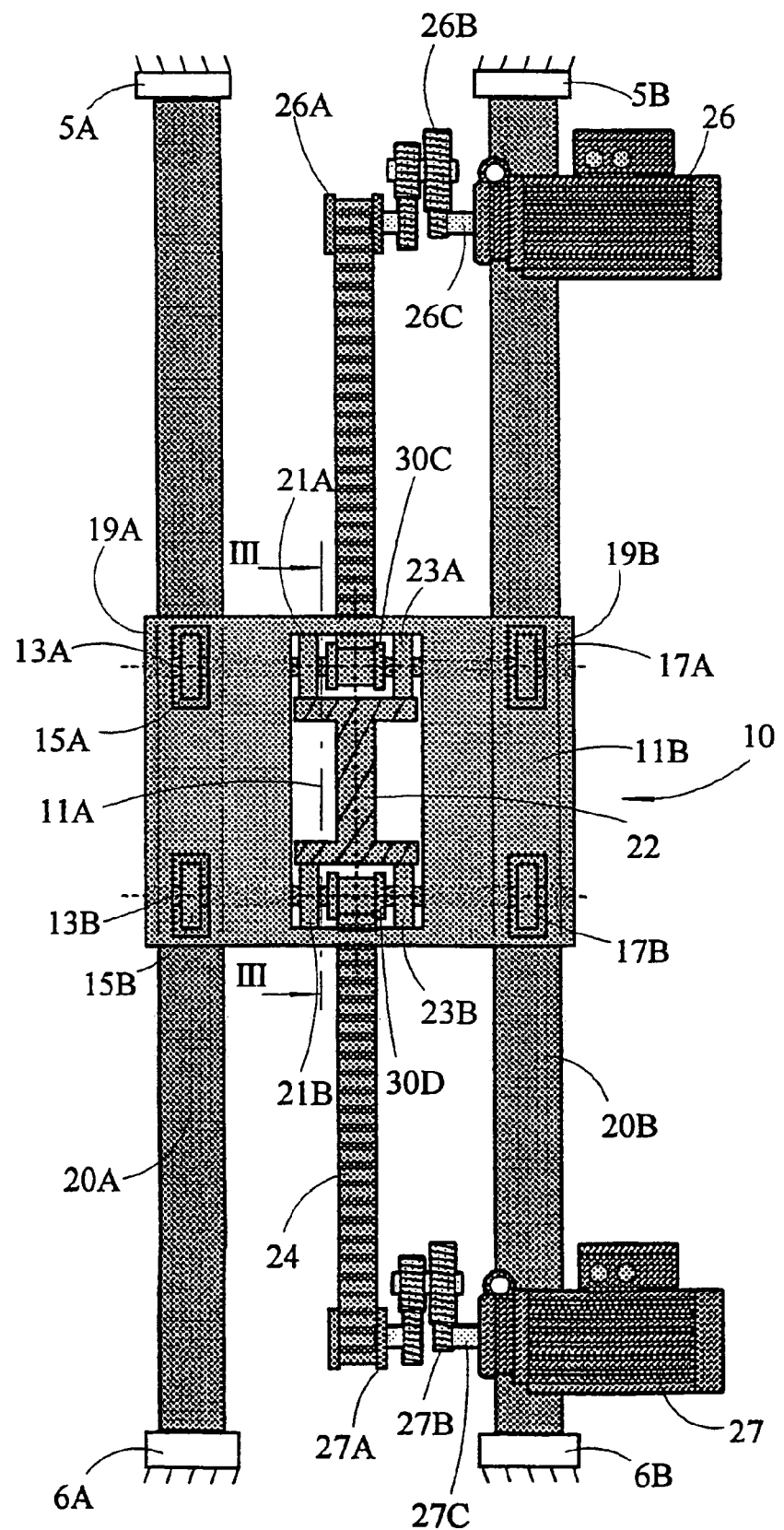
FIG. 2 shows a preferred embodiment of the robot according to the invention viewed from above, partially in cross section.

Owing to the fact that the motors are fixed and are not displaced during operation, the weight of the moving parts 12, 22, 28A–D, 30A–D is made very low, allowing increased transfer speeds to be used. This results, in turn, in the capacity in a pressing line being able to be raised. Simultaneous with the increase in capacity, the following advantages are obtained:

Lower energy consumption
Lower material cost
Less maintenance, and
Greater accessibility FIG. 2 shows a preferred embodiment of a robot according to the invention, viewed from above, partially in cross section. It is shown that the movable robot unit 10 is arranged on two horizontal beams 20A, 20B. The slide 11 is made up of two side plates 19A, 19B and a top 11B and bottom plate 11C (see FIG. 3). Fixedly anchored in the side plates there are four shafts 13A–13D, only the two upper ones of which are visible in FIG. 2. On each shaft a number of freely mounted guide wheels 15A, 15B and 17A, 17B are arranged both on top and below with precise fitting in relation to the respective beam unit 20A, 20B, so that the slide 11, without any real friction resistance, is guided by these rollers as it is displaced along the beam units 20A, 20B in what can be termed the X and Y directions. In order to produce precise guidance of the slide 11 in a third direction, i.e. the Z direction, the side plates 19A, 19B are used, which interact with the outer sides 20A, 20B of the beam units. FIG. 2 further illustrates that the vertical beam unit 22 has an I-beam cross section and is arranged inside a recess 11A in the middle of the slide. The beam unit 22 is precisely guided inside this recess 11A by means of guide rollers 21A, 21B and 23A, 23B, which are also freely mounted around the said shafts 13A, 13B. The deflection wheels 30C and 30D are also mounted on the said shafts 13A and 13B respectively. The motors 26 and 27 are both arranged on one of the beam units 20B. Via a gear 26B and 27B respectively, the drive wheels 26A and 27A drive the belt 24 forward.

Figure 3:
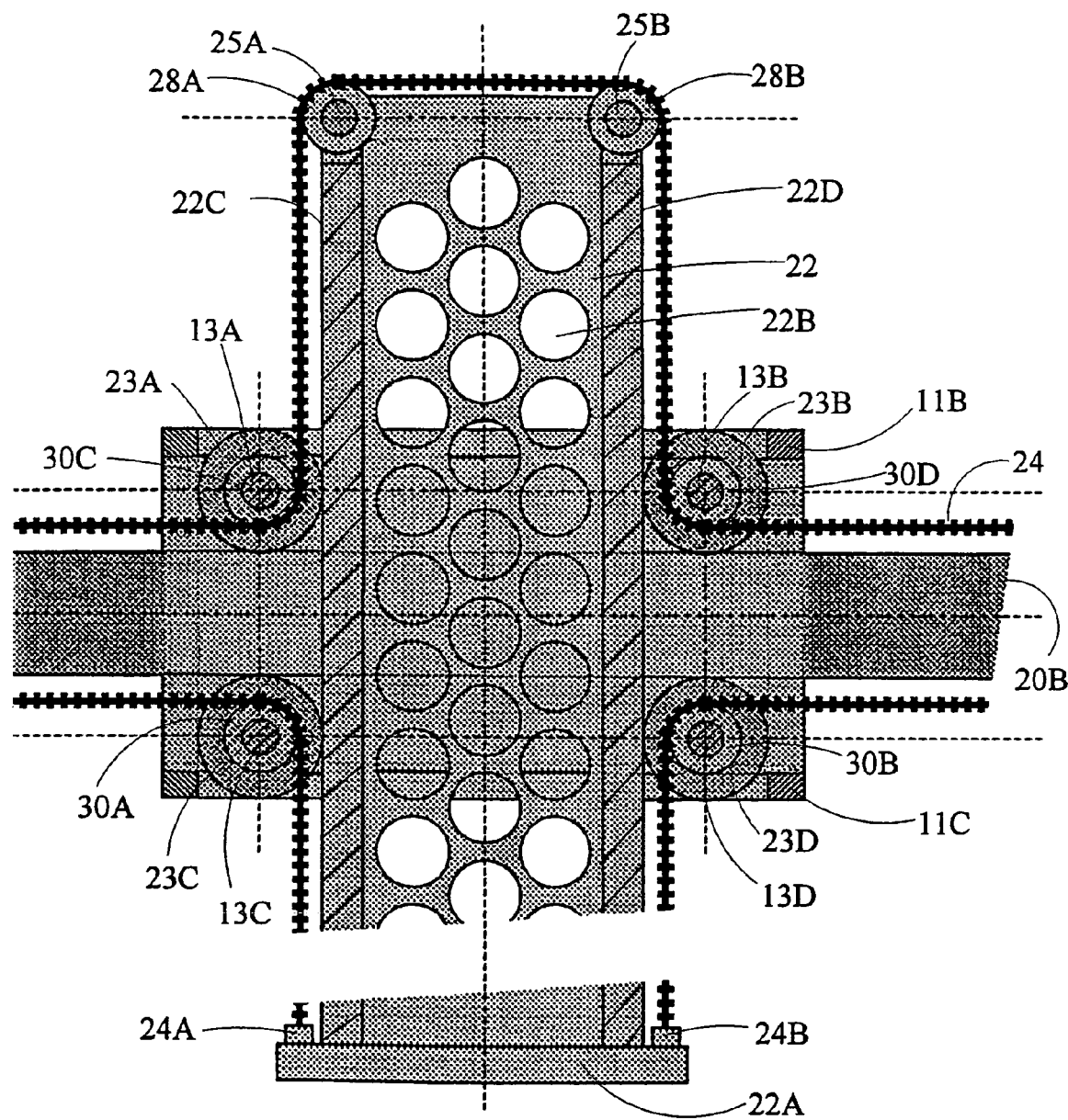
FIG. 3 shows the robot according to FIG. 2 in greater detail in a view from the side.

FIG. 3 shows a side view in cross section along the marking in FIG. 2. It can be seen that the vertical beam 22, which has a cross section in the form of an I-beam (see FIG. 2), is advantageously configured with relief holes 22B, with a view to making the robot as light as possible. The beam 22 is guided using its outer surfaces 22C, 22D. The one side 22C is guided by being in contact with four guide rollers 23A–23D located in one and the same vertical plane. In addition, a like set of guide rollers 21A–21D (see FIG. 2) guides the other side 22D of the beam in another, parallel vertical plane. There are therefore eight guide rollers 23A–23D, 21A–21D in total, ensuring a precise guidance/displacement of the vertical beam. These guide rollers do not however in any way drive the beam. The driving of the beam unit is in the sole charge of the drive belt 24, which acts upon the beam unit 22 by being fastened to the one end 22A thereof and being routed via the deflection wheels 30A–30D. The deflection wheels 30A–30D like other guide wheels and deflection wheels arranged on the slide 11, are mounted along one and the same continuous shaft 13A–13D. There are therefore four such shafts and on each shaft, the upper left one 13A, for example, there are arranged two guide wheels 15A, 17A in FIG. 2 for the motion of the slide along the beams 20A, 20B, two guide wheels 21A, 23A for the guidance of the vertical beam unit 22, and a deflection wheel 30C, which is placed on the midpoint of the shaft. The shafts 13A–13D are fixed in the outer plates 19A, 19B belonging to the slide 11. The slide is held together by means of the inner plates 19B and the lower and the upper cover unit 11B, 11C. All guide wheels and deflection wheels are therefore freely mounted around the said shaft 13 and are arranged such that they are able to rotate freely in relation to the construction parts 11, 19 of the slide. As can be seen from FIGS. 2 and 3, identical guide wheels are preferably used both for the motion of the slide and for the motion of the vertical beam, so that four equal-sized guide wheels, expediently identical ones, are seated on one and the same shaft 13. The diameter of the deflection wheels 30A–30D must therefore be smaller than that of the guide wheels to enable these to rotate freely and the belt 24 to run freely. Finally, FIG. 3 shows that the upper deflection wheels 28A, 28B for the belt 24 are freely mounted around shafts 25A, 25B, which each have been anchored in the upper end of the vertical beam 22, in one corner each thereof.

Figure 4:
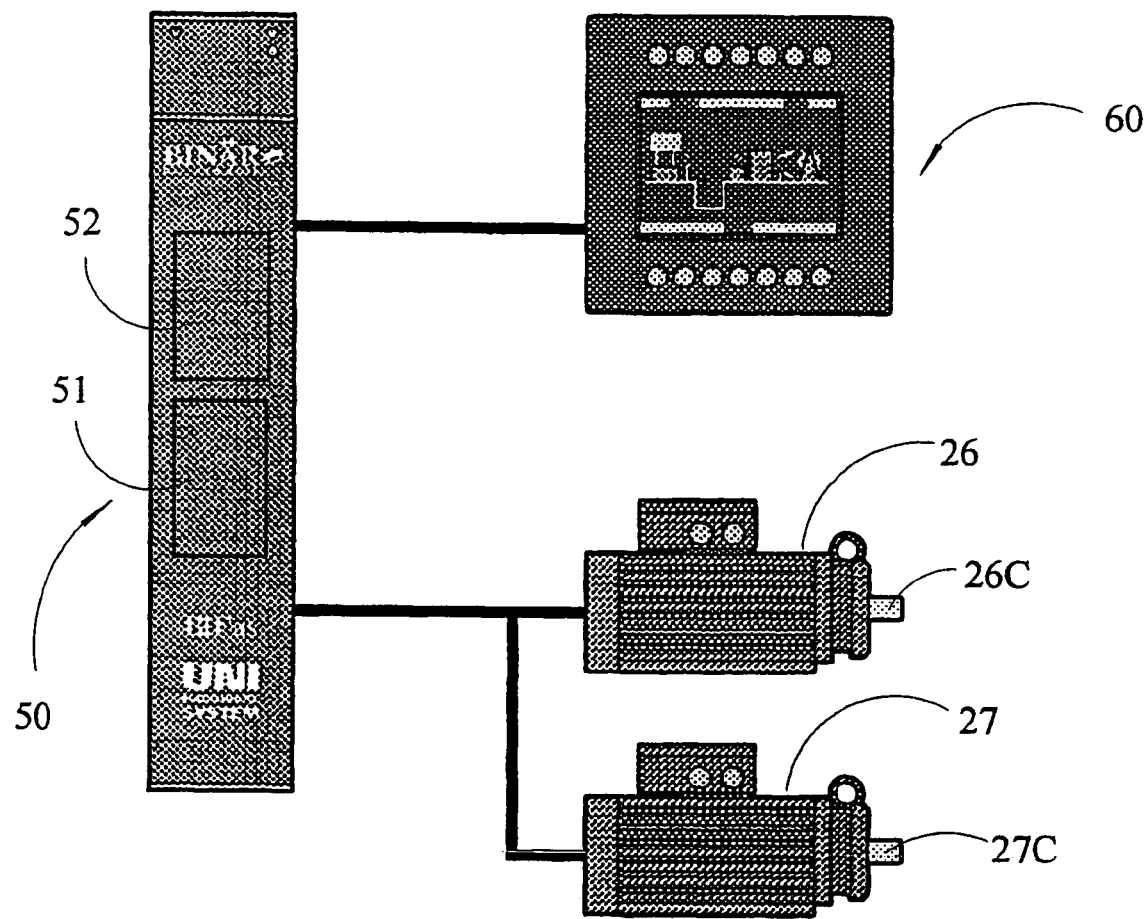
FIG. 4 shows the control unit and how this is connected up to a control panel and the motors, FIG. 5, which includes incremental

FIG. 4 shows in diagrammatic representation the operator panel 60, a HMI unit (Human Machine Interface) as it is known. The HMI unit 60 is connected to the control unit 50, which, in turn, controls the motional plan for the robot by means of the two motors 26, 27, which should more accurately be termed servo-motors with associated power electronics.

The control unit 50 comprises a control computer 51 having a memory unit, a processor unit, etc. The control unit additionally incorporates a registration unit 52, which, inter alia, continuously registers the positions of each rotor of the motors 26, 27, this being effected by means of situation sensors on the respective shaft (rotor). The control computer 51 coordinates the motions of the servo-motors 26, 27, so that the motional pattern of the robot is what the operator learns for a specific motion.

The control computer obtains, via the registration unit 52, continuous information on the situation of the shafts, this information being continuously used by the control computer 51 to control the motors. Apart from controlling the actual motion, the control computer 51 is also used to store data for a variety of motional patterns, for example speeds and positions of the shafts.

The control computer 51 is programmed with special software to be able to drive the load (the panel) very quickly and, at the same time, expose the panel to minimal force stresses (gentle speed changes) through the use of sophisticated control functions, thereby enabling a robot according to the invention to maintain a high production rate between two presses. The servo-motors 26, 27 are the component which brings about the actual motion commanded by the control computer. The servo-motors follow the command (positions) of the control computer very precisely and update their positions (motions) in thousandths of a second. Typical ratings of the servo-motors are ca: 3–10 kW. The operator panel 60, also referred to as the HMI=Human Machine Interface, is used to enable the operator easily to operate the robot and program (teach) it to follow various motional patterns.

Typical "teach-in", i.e. handling sequence for learning of motional patterns:

1. The operator drives the robot 10, by manual control from the operator panel 60, into a situation (E2) in which the panel 2 is collected in the press 3 (see FIG. 1).
2. Presses the "teach-in" key on the operator panel 60 and the "collecting situation" position is stored in the control computer 51 by the registration unit 52 relaying the precise position of each rotor in this chosen situation.
3. The operator drives the robot vertically into a situation directly above the collecting situation (E2), whence the panel can be driven horizontally without colliding with the pressing tool, the point being referred to as the "horizontal free collection".
4. Presses the "teach-in" key and the "horizontal free collection" position is stored in the control computer 51, by the registration unit 52 relaying the precise position of each rotor in this chosen situation.

5. The operator drives the robot horizontally into a situation directly above the pressing tool in the press 4 in FIG. 1, whence the panel can be driven vertically directly down to the pressing tool, the point being referred to as "vertical pressing tool delivery".
6. Presses the teach-in key and the "vertical pressing tool delivery" position is stored in the control computer 51, by the registration unit 52 relaying the precise position of each rotor in this chosen situation.
7. The operator drives the robot vertically into a situation in the pressing tool in which the panel can be delivered, the point being referred to as the "delivery situation" (F2), in which the panel is delivered in the press 4.
8. Presses the teach-in key and the "delivery situation" position is stored in the control computer 51, by the registration unit 52 relaying the precise position of each rotor in this chosen situation.

In each position which has been programmed by the use of "teach-in", indication is also given of how gently (accurately) and at what speed the point should be reached. Using the software, the control computer then automatically chooses the best possible displacement between indicated positions in order to achieve fastest possible displacement.

Figure 5:
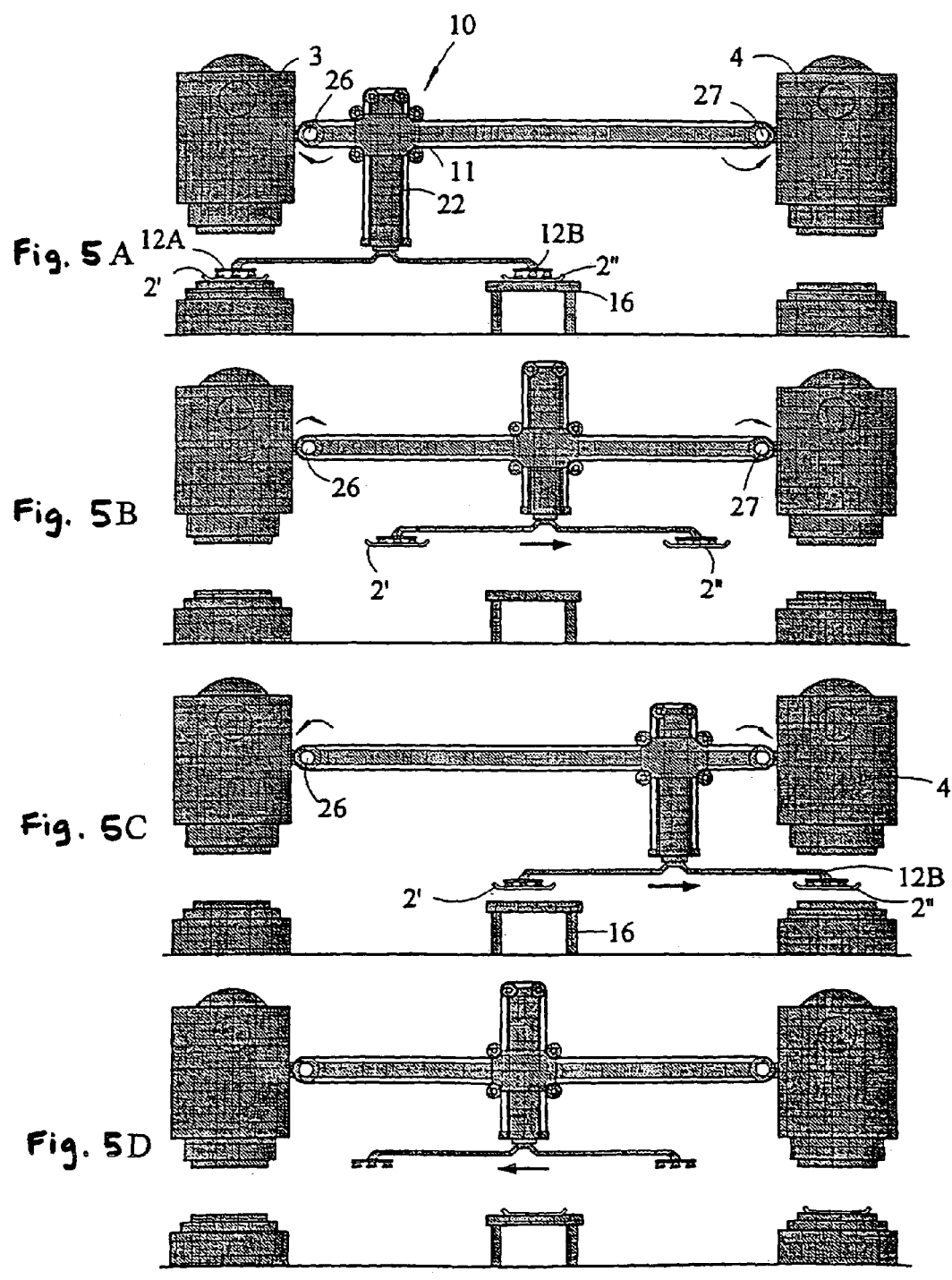
FIGS. 5A–5D, shows in diagrammatic representation how the robot works together with a fixed intermediate table, FIG. 6, which includes incremental

FIG. 5 shows in diagrammatic representation how a work piece 2' is displaced from one workstation 3 to another workstation 4 by means of a robot 10 according to the invention in combination with a fixed intermediate table 16. Fig. A illustrates how the one gripping mechanism unit 12A moves down and takes hold of the work piece 2 through the activation of suction heads attached to the gripping unit 12A. Once the work piece has been fixed to the gripping unit 12A, which is registered by the control unit 50 by the attainment of a certain suction force (ΔP) by means of the suction heads, the two motors 26, 27 start to rotate in opposite directions, thereby producing a vertical motion of the vertical beam 22. Immediately afterwards, or in conjunction with this, the left motor 26 increases its rotation speed, thereby imparting a horizontal motion, i.e. the slide 11 also begins to move. This displacement is effected along a desired path, which is programmed in using the previously described "teach-in" process. A large part of the displacement is effected only in the horizontal direction, as illustrated in Fig. B. Here the two motors are rotating in the same direction, i.e. the right motor has here changed rotation direction, and a rapid horizontal displacement is achieved. Fig. C shows the robot approaching its farther end position, a certain vertical motion also having been imparted by virtue of a change of rotation direction by the left motor. Immediately thereafter, the robot uses the right gripping mechanism unit to deliver a work piece 2" 12B in the farther press 4. At the same time, it also delivers the work piece 2 which it collected in the left press 3 onto the fixed table 16. After this, the robot returns, in principle, along the same path as it took in the other direction, so as to collect a new work piece 2 from the left pressing unit 3 and, at the same time, grip the intermediate work piece 2' for displacement in the farther press 4.

Figure 6:
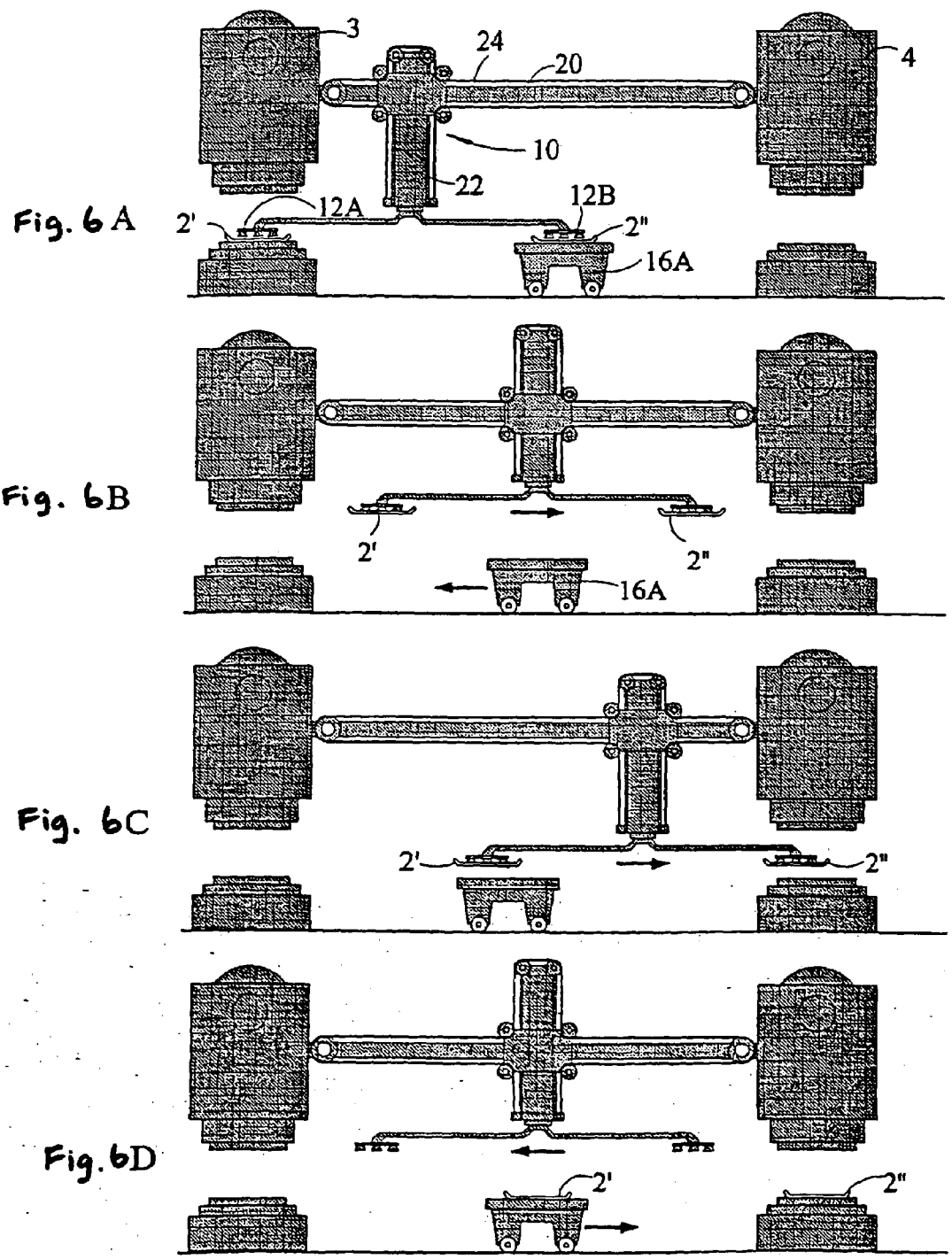
FIGS. 6A–6D, shows in diagrammatic representation how the robot works together with a movable intermediate table, FIG. 7, which includes incremental

FIG. 6 illustrates the same displacement, in principle, as in FIG. 5, with the difference that a movable intermediate table 16 A is used. By using a movable intermediate table 16A, the distance for the displacement between the pressing units is shortened. In the case of a fixed intermediate table, the distance between the pressing unit and the intermediate table 16 should, in fact, correspond to the distance between the two gripping mechanism units 12A, 12B, whilst with a movable intermediate table the distance between the pressing units can be shortened by the movable intermediate table 16A positioning itself in a compensatory manner. Otherwise the principles for the displacement are the same as in FIG. 5.

Figure 7:
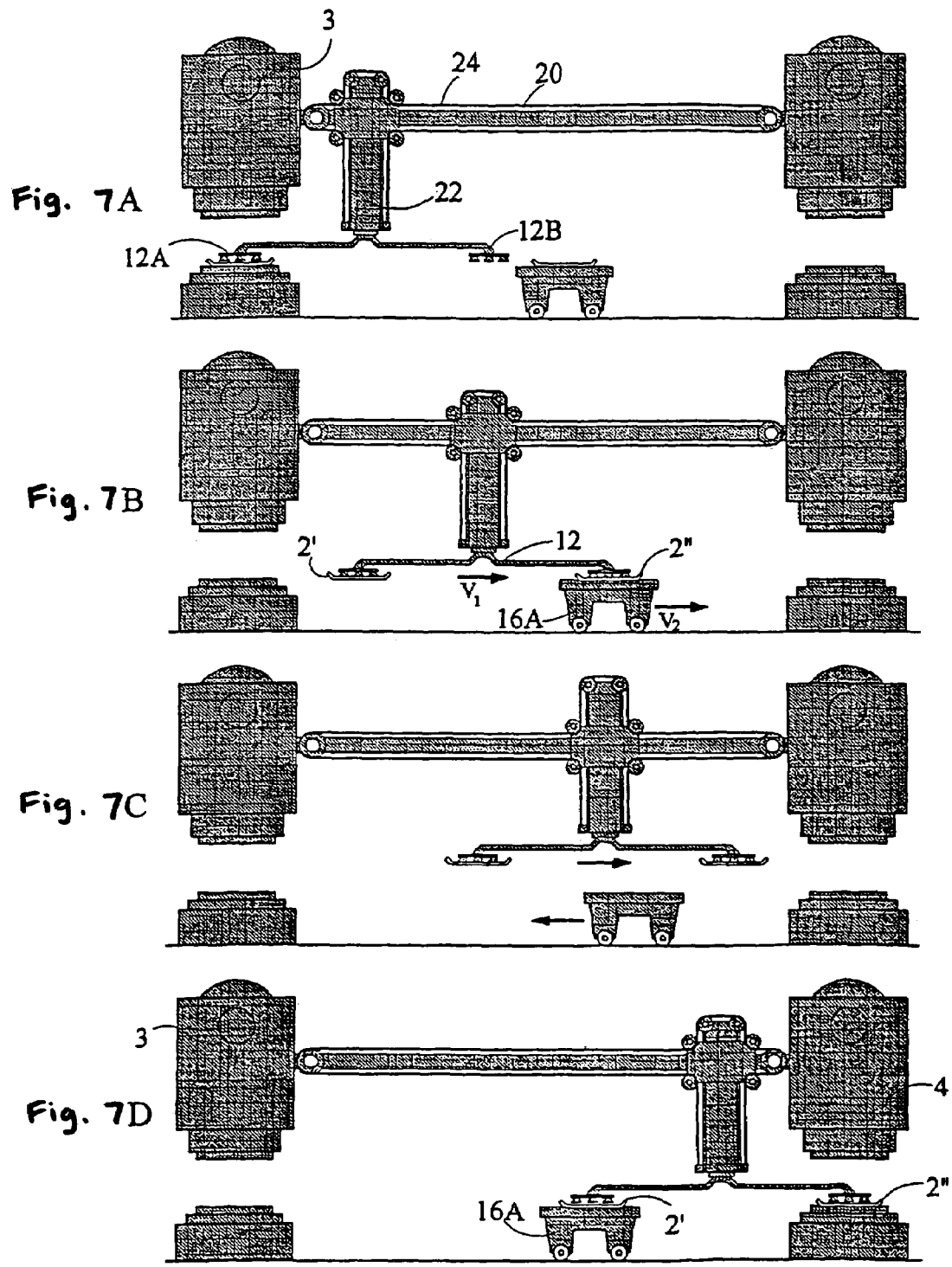
FIGS. 7A–7D, shows in diagrammatic representation a modification of how the robot can work with a movable intermediate table, FIG. 8, which includes incremental

FIG. 7 shows a modification of a process according to FIG. 6. In this case, the inter-mediate table 16A is used in such a way that the robot unit 10 never needs to stay up in connection with the intermediate storage. Instead, the farther gripping mechanism unit 12B grips the intermediate work piece 2" in flight (see FIG. 7B). In the gripping operation, the gripping mechanism 12 moves at the same speed as the intermediate table 16A, with V1=V2, which is brought about by means of the control unit 50, which thus coordinates the motion for the robot 10 with the intermediate table 16A. After the right work piece has been picked up with the right gripping unit 12B, the intermediate table 16A then moves in the opposite direction, i.e. to the left in the picture, so as to position itself such that the left gripping mechanism unit 12A can deposit its workpiece 2' on the intermediate table at the same time as the right gripping mechanism unit 12B delivers its work piece 2" in the right pressing unit 4.

Figure 8:
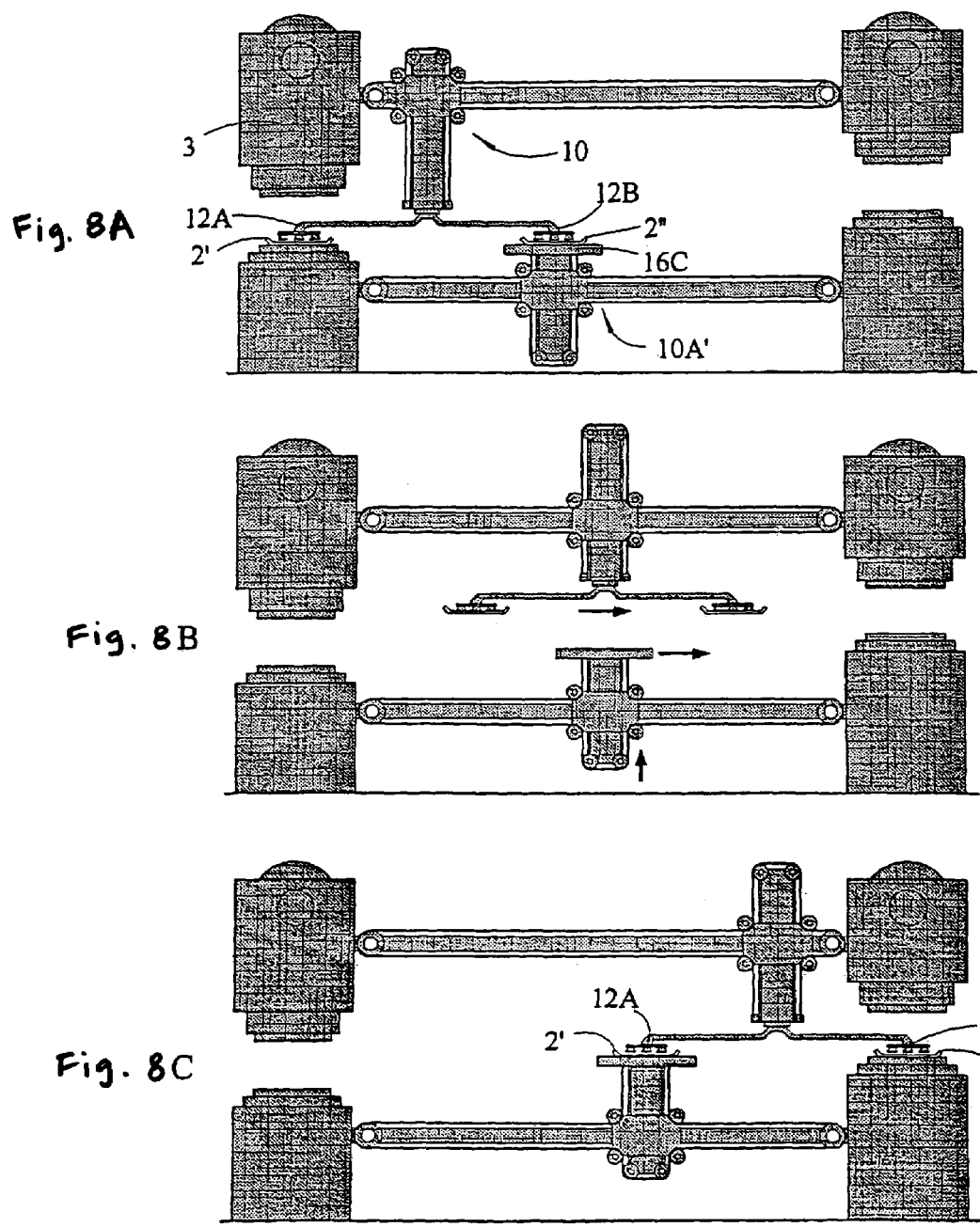
FIGS. 8A–8C, shows how two robots according to the invention can be used to obtain different heights in collection and delivery situations.

FIG. 8 shows an embodiment in which collection and delivery takes place at different levels in the first 3 and second pressing unit 4. In this case, the intermediate table 16C is supported by a robot unit 10A according to the invention, which is facing up and down in relation to the actual robot unit 10. The two robot units are synchronized by means of the control unit 50, so that the same collecting height level is obtained for the inter-mediate table 16C when collection is made from the left pressing unit 3. After this, a displacement is effected, in principle according to what has previously been described, to the right in the picture, so as to be able to deliver the work piece 2" with the right gripping mechanism unit 12B in the right pressing unit 4. Simultaneous with displacement of the robot unit 10, displacement takes place of the lower robot unit 10A with the intermediate table 16C, so that the intermediate table 16C is then at the same level as the depositing height in the farther pressing station 4.

It will be realized that the advantages described in FIG. 8 of an intermediate table adjustable in the vertical direction can also be utilized if the intermediate table is fixed in the horizontal direction. Apart from the above-described advantage of being able to deliver when there are different height units, there is also the advantage that an inter-mediate table which is adjustable in the vertical direction can be used to compensate for any changes in the positions of the gripping mechanism. One example of such a change is that the one arm 12A of the gripping mechanism receives a powerful jolt, which bends this gripping mechanism arm and hence alters the position of the gripping mechanism 12A. Normally, this would mean that the gripping mechanism would have to be changed and the device calibrated. With the aid of an intermediate table which is adjustable in the vertical direction, one can instead continue to use the altered gripping mechanism 12 and, by means of a new teach-in, "teach the system" the altered gripping mechanism position 12A, thus enabling both time and cost savings to be made.

Figure 9:
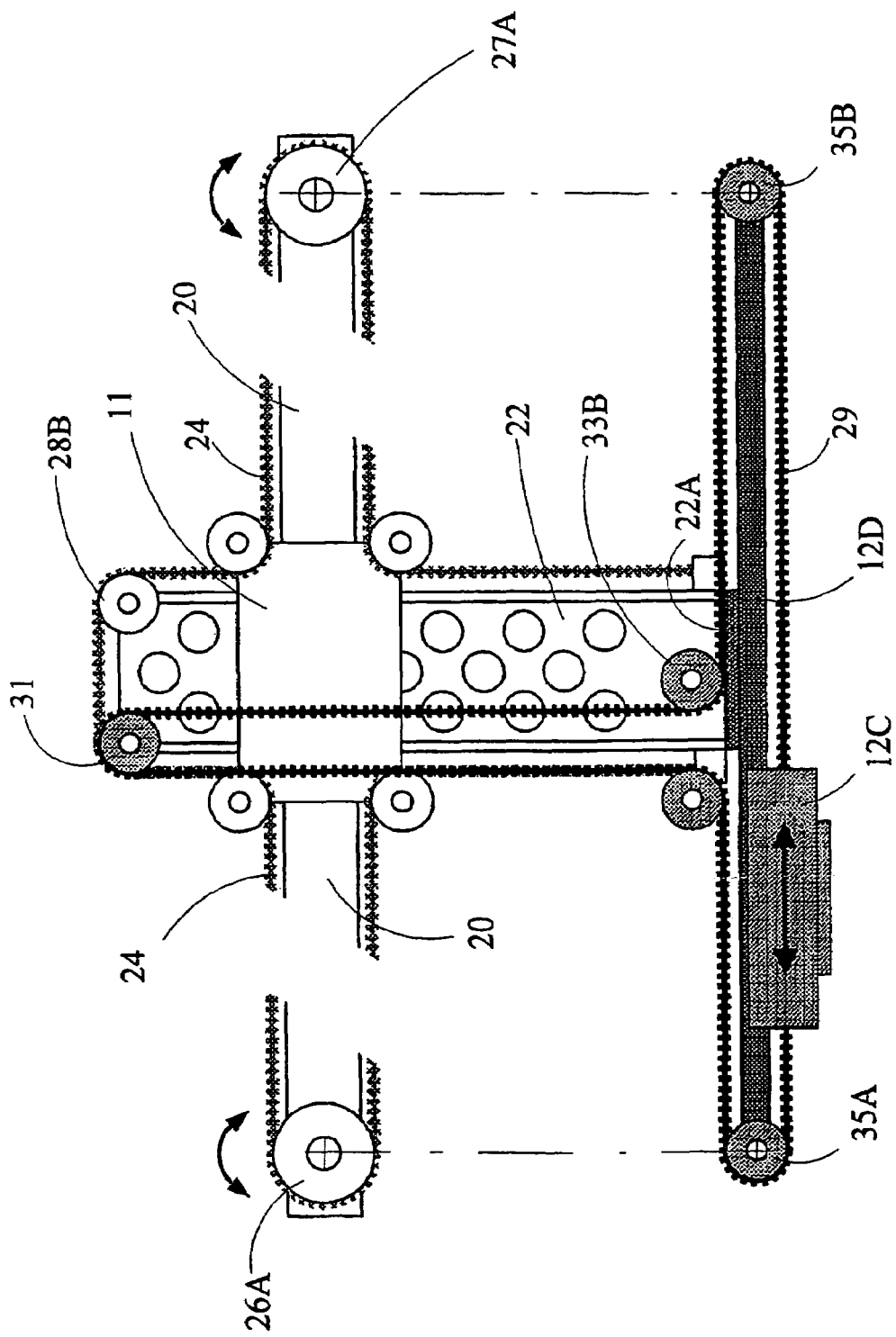
FIG. 9 shows a preferred embodiment according to the invention, in which the robot is arranged with a displaceable gripping mechanism, FIG. 10, which includes incremental

FIG. 9 shows a basic diagram of a robot unit according to the invention, in which a movable gripping mechanism 12C has been arranged on the lower end 22A of the vertical beam 22. The design of the beam unit 20, the slide 11 and the belt 24 with its drive mechanism is the same as has been described above. Over and above the customary drive belt 24, FIG. 9 reveals that a further drive belt 29 has been provided with a view to being able to perform further motions with the gripping mechanism 12C. This drive belt 29 is driven by means of a drive wheel 31, which is connected to one of the outer deflection wheels 28A. The drive belt 29 will consequently move in a synchronized manner in relation to the robot 10. In the illustrated case in which the drive wheel 31 has the same diameter as the deflection wheel 28A, the displacement speed of the second drive belt 29 will be exactly the same as for the first drive belt 24. The horizontal displacement of the gripping mechanism 12C along its beam 12D thus becomes equal to the horizontal displacement of the slide 11, so that the gripping mechanism 12C moves twice as fast in the horizontal direction as the slide 11. By arranging the deflection wheel 33A, 33B on the lower end of the vertical beam and, in addition, providing a horizontal beam unit 12D on the ends of which deflection wheels 35A, 35B are arranged, a precisely synchronized displacement of the gripping mechanism 12C will occur when the slide 11 is displaced in the horizontal direction. According to the illustrated embodiment, the centre of rotation for the outer deflection rollers 35A, 35B is placed in the same plane as the respective centre for the drive wheel 26A and 27A respectively situated above it. No displacement of the gripping mechanism unit 12C will occur when only a vertical displacement of the beam unit 22 is made, since the belt 24 on the upper end of the beam unit does not then perform any relative motion, i.e. the deflection rollers 28A, 28B remain stationary. The fastening for the gripping mechanism 12C in the beam 12D is arranged in a manner appropriate thereto, preferably by means of guide rollers in order to minimize the friction, in principle according to what has been shown for suspension of the slide 11 and the vertical beam 22.

Figure 10:
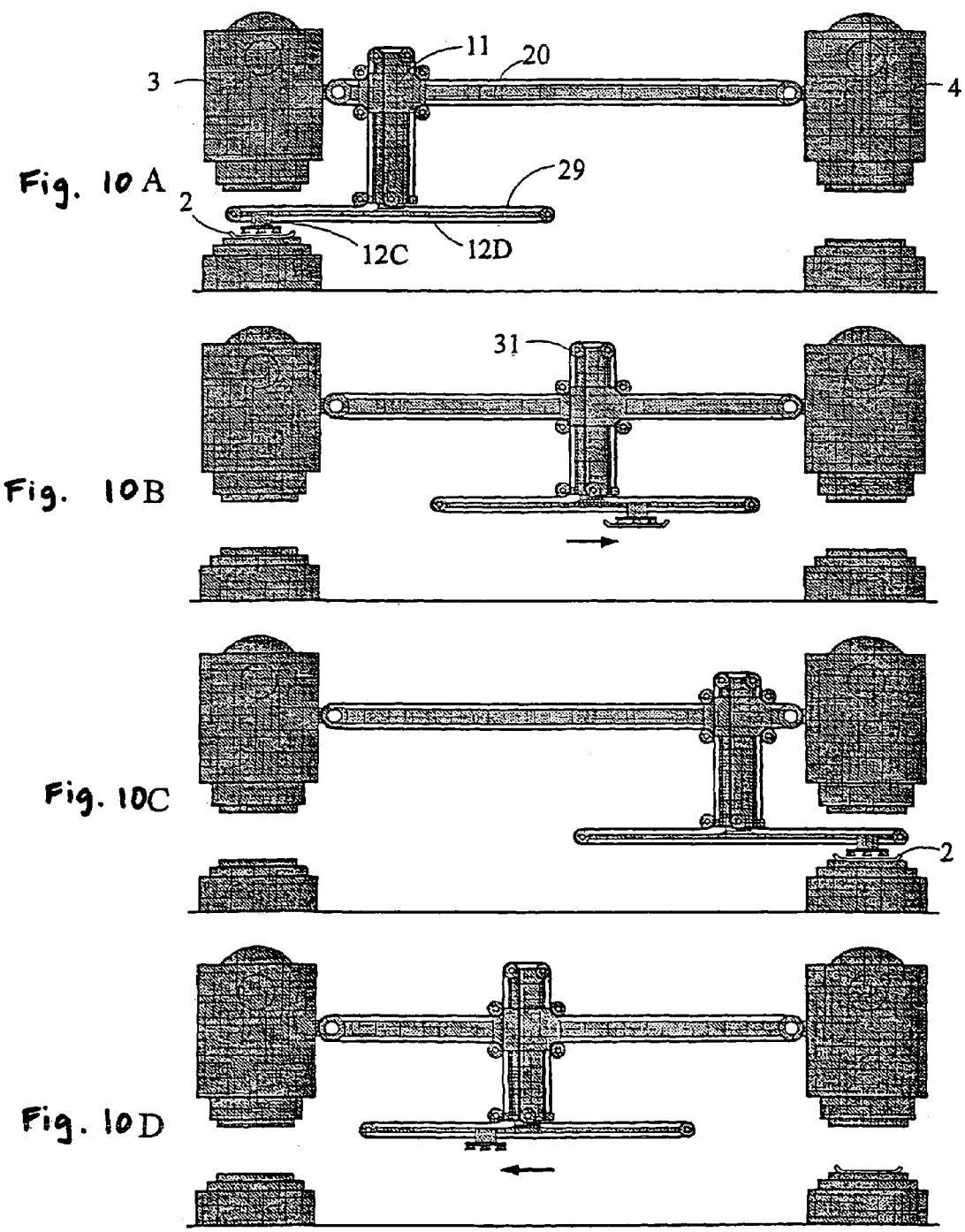
FIGS. 10A–10D, shows in diagrammatic representation the working of a robot according to the invention having a displaceable shuttle, FIG. 11, which includes incremental

FIG. 10 illustrates how a robot according to the invention, having a movable gripping mechanism 12C according to FIG. 9, works. According to what is shown in FIG. 10, the beam 12D along which the movable gripping mechanism 12C shifts is somewhat shorter than the fixed beam unit 20. The gripping mechanism unit 12C will therefore shift a somewhat shorter distance than the actual slide 11. In order to achieve this, the gearing is made somewhat smaller for the motion of the slide by using a drive wheel 31 of a diameter which is smaller than the diameter of the deflection wheel 28A by the same amount as the beam 12C is shorter than the fixed beam 20. A fully synchronized motion is consequently obtained, which means that the displaceable gripping mechanism 12C is at the respective end point when the slide 11 is in the respective end situation along the beam 20. The figure illustrates how the gripping mechanism 12C collects a work piece 2 from a first pressing unit 3 by moving down, making contact with the work piece 2 and activating the suction heads. After this, the robot unit lifts up the work piece 2 and displaces it with overlaid speed, i.e. the combined speed of the speed of the slide 11 plus the speed of the gripping mechanism away to the second pressing unit 4 in which it is put down so as to return later and collect the next work piece 2.

According to one modification, the gripping mechanism 12, instead of being forcibly controlled, can allow itself to be displaced, by means of the energy of the retardation, from the one side to the other. When the robot 10 is braked at the end of the horizontal displacement, the gripping mechanism 12 will then slide from the one side of the beam 12D to the other.

Figure 11:
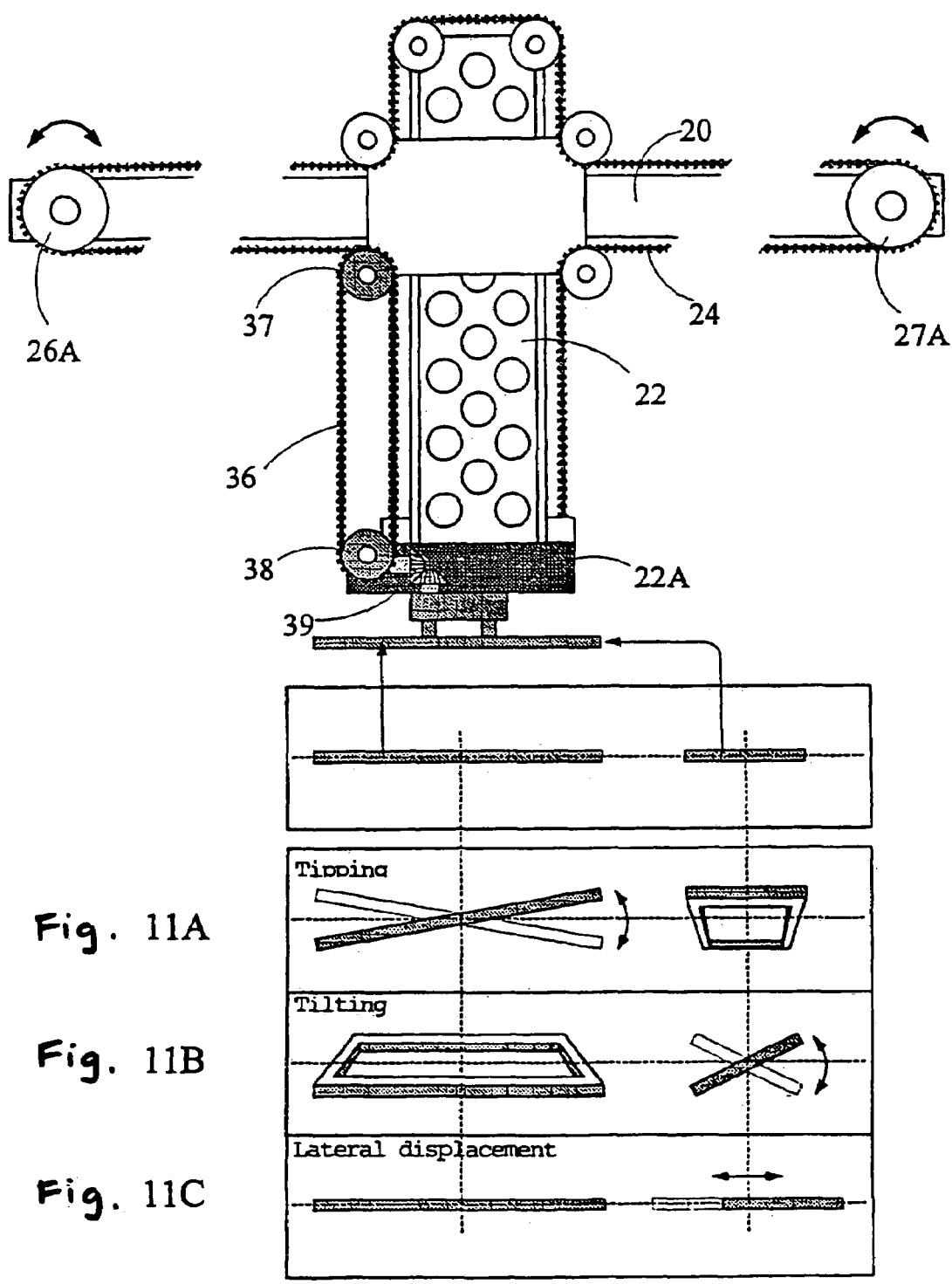
FIGS. 11A–11C, shows a robot arranged with a third shaft according to a further modification according to the invention.

FIG. 11 illustrates that a robot unit according to the invention 10 can be equipped with a further function, namely tipping, tilting and/or lateral displacement, by the fitting of a further drive belt 36, which, like the belt 29, for operation of a movable gripping mechanism 12C, is driven by means of a drive wheel 37 connected to one of the deflection wheels. In the illustrated case according to FIG. 11, the drive wheel 37 is connected to the lower, left deflection wheel 30A. The drive belt 36 additionally runs round a driven wheel 38, which, via its output shaft (not shown), drives a transmission 39 which is known per se. This transmission 39 can be adjusted to perform different forms of motions according to requirement, for example tipping (FIG. 11A), tilting (FIG. 11B) or lateral displacement (FIG. 11C). Placement of the drive wheel 37 in the desired position enables the motion to be automatically synchronized to be performed when required, since the various deflection wheels, according to what has previously been described, rotate on separate occasions during the displacement. The transmission 39 according to the illustrated example will therefore only be activated in connection with vertical displacement of the beam unit 22 in relation to the slide 11, since the deflection roller 30A does not rotate in connection with a pure horizontal displacement. Normally speaking, this transmission 39 is thus only activated in connection with picking and delivery of a work object, which on many occasions is desirable in order to be able rapidly to displace the object out of and into a pressing unit.

Figure 12:
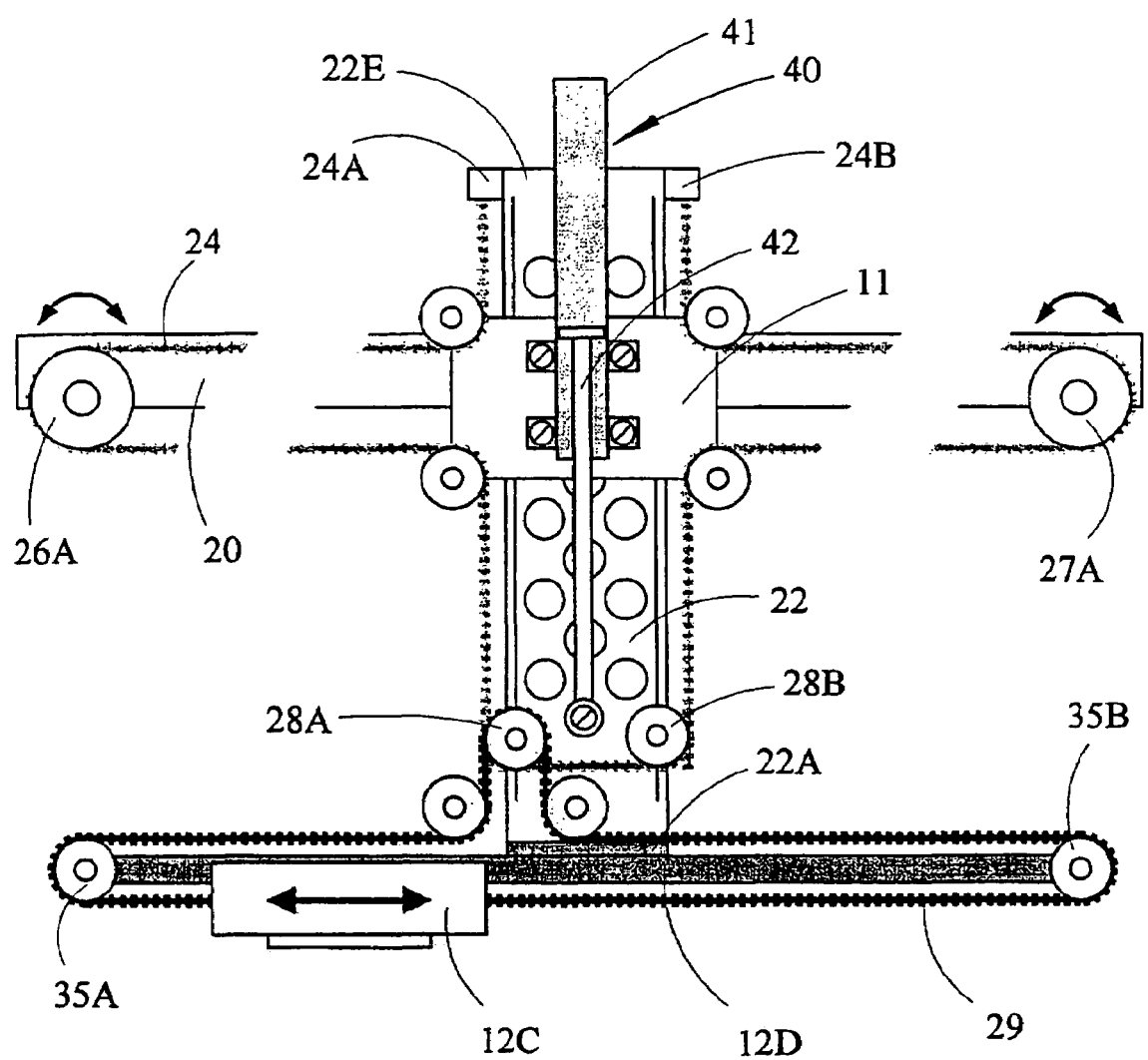
FIG. 12 shows a modified embodiment of a device which in principle works according to that which is shown in FIG. 9.

FIG. 12 shows an embodiment which, in essential elements, works according to what has been described in connection with FIG. 9. In what follows, the focus will therefore be upon fundamental differences in relation to FIG. 9. A first important difference is that the drive belt 24 is fastened to the upper end 22E of the vertical beam 22. Whether the fastening is made in the top edge or bottom edge (as shown in FIG. 9) has no functional effect with respect to the working principle, but offers the option of using a shorter drive belt 29. According to the embodiment in FIG. 12, the drive belt 29 is arranged directly around one of the outer deflection wheels 28A which is placed on the lower end 22A of the vertical beam 22. With the aid of this "inverted" solution, a substantially shorter drive belt 29 can therefore be used. It can further be seen that a balancing cylinder 40 is used. The balancing cylinder 40, which expediently is pneumatic, is arranged with the cylinder unit 41 on the slide 11, which is movable in the horizontal direction, and with the piston unit 42 arranged close to the lower end 22A of the vertical beam 22, which is movable in the vertical direction inside the slide 11. As is previously known per se, balancing cylinders can be used to balance out forces acting in the vertical direction (gravitational force). The balancing cylinder 40 can thus be used to find a desired state of equilibrium in the vertical direction for the vertical beam 22 in relation to the slide 11, yielding the advantage that the motors 26A, 27A have no need to generate any force via the drive belt 24 in order to maintain the gripping mechanism in a balanced state. From the energy aspect, it is, in fact, undesirable for the motors to need to be activated in certain idle states. Instead, one can choose to put pressure inside the balance cylinder 40 (can be more than one), so that the piston 42, in the state of balance, assumes the desired position of the gripping mechanism without the motors, via the drive belt, needing to secure any force to counteract the gravitational effect.

The invention is not limited to what has been illustrated above but can be varied within the scope of the following patent claims. It will therefore be realized, inter alia, that many different forms of solutions can be used to arrange the slide in a sliding manner on the beam 20 and to arrange the beam unit 22 such that it is slidable inside the slide 11. Instead of that which has been illustrated, a multiplicity of guide wheels can be used, for example arranged between all surfaces with relative motion in relation to one another, as well as needle ball bearings, etc. Guide systems without the use of guide wheels are also possible, preferably through the use of low-friction material, PTFE type, for configuration of the sliding surfaces, expediently in the form of low-friction material in contact with a metal surface offering high abrasion resistance. Guide pins and guide bushings interacting with guide grooves also represent conceivable solutions which are within the scope of the options of the person skilled in the art. It will further be realized that the number of devices which has been described and illustrated is by no means limiting. It will therefore be realized, for example, that instead of one drive belt a plurality of drive belts can be used, for example with a view to guarding against operating stoppage if a belt were to tear. Even though gear-driven belts, as illustrated, are preferable, the device can also be driven by means of other similar elements having the same function, for example chains. It will further be realized that the invention can be used with many types of gripping mechanism other than suction heads, for example gripping claws, electromagnets, etc. It will also be realized that the side plates 19A, 19B can equally well be placed on the inside (instead of the outer side) of the beams 20A, 20B in order to guide the slide 11 in the lateral direction, and that these plates 19A, 19B, as well as other displaceable parts, are expediently configured, like the beam 22, with relief holes.

The invention claimed is:

1. A method for rapidly transferring a work object in both horizontal and vertical directions, the method comprising:
    providing a robot unit having a gripping mechanism;
    providing a first workstation and a second workstation between which to transfer the work object, the work object weighing between one kilo and forty kilos, and the transfer in the horizontal direction being at least one meter but less than ten meters and at least partially being effected along an essentially horizontally extending beam;
    arranging the gripping mechanism such that, at least in a first end situation along the beam, the gripping mechanism can collect the work object in a first position situated beyond the first end situation along the beam,
    controlling the robot unit with a control unit;
    driving the robot unit with a belt member and at least two motors having rotor units connected to drive wheels for the belt member;
    immovably arranging the at least two motors in relation to the first and second workstations;
    effecting transfer of the work object without displacement of either of the at least two motors;
    executing the entire transfer of the work object along the beam;
    providing the belt member as a single continuous drive belt, which, at the same time, is connected to and driven by the drive wheels; and
    guiding the transfer of the work object along a pre-programmed path using a control computer in the control unit, through continuous control and registration of the situation of each of the rotor units of the motors,
    wherein the gripping mechanism moves along the beam and is arranged with at least two gripping units, a first gripping unit collecting the work object from the first position and a second gripping unit depositing the work object in a second position beyond a second end situation along the beam, each of the first and second gripping units collecting and placing objects simultaneously with the other unit,
    wherein an intermediate storage for change of place of the work object is effected before the work object is transferred from the first position to the second position,
    wherein the first gripping unit collects the work object from the first position and deposits the work object at the intermediate storage, and the second gripping unit collects the work object from the intermediate storage and deposits the work object in the second position, and
    wherein transfer of the work object in the horizontal direction is unobstructed by the robot unit,
    the robot unit comprising:
        a first beam unit extending between two end points and the first and the second workstation, wherein the first beam unit is the essentially horizontally extending beam;
        a slide which is arranged movably along the first beam unit, wherein the slide defines a vertical opening, and wherein the slide comprises a first pair of opposing guide rollers on a first side of the vertical opening and a second pair of opposing guide rollers on a second side of the vertical opening opposite to the first side of the vertical opening;
        a second beam unit which extends essentially perpendicular to the first beam unit and which is arranged movably on the slide, wherein the second beam unit moves vertically within the vertical opening, and wherein the first and second pairs of opposing guide rollers contact the second beam unit;
        the gripping mechanism arranged on one end of the second beam unit, wherein the gripping mechanism includes the first and a second gripping unit, the units capable of simultaneously picking up separate objects; and
        the at least two drive motors, which are connected to the control unit, a number of deflection rollers, and the belt member,
        wherein the belt member is in the form of a single continuous drive belt which runs around the drive wheels of the drive motors and the deflection rollers and is fastened to the one end of the second beam unit, and
        wherein the gripping mechanism reaches end points placed beyond the two end points of the horizontal beam, and
        wherein the control unit is connected to an operator panel through which the control computer in the control unit can continuously be re-programmed by manually controlling the gripping mechanism to move into chosen situations,
        wherein the belt member is disposed in between the first and second pairs of opposing guide rollers.

2. The method according to claim 1, wherein the gripping mechanism is arranged on the robot unit in such a way that a further horizontal motion, which overlays transfer along the horizontal beam, can be achieved.

3. The method according to claim 1, wherein the pre-programmed path is programmed by an operator's actually transferring the gripping mechanism through a work cycle, and wherein successive registration of desired values is programmed in with respect to the rotor units forming part of the said motors, so that the control computer, through communication with a registration unit, can subsequently ensure automatic operation.

4. The method according to claim 1, wherein the gripping mechanism comprises an elongated member.

5. The method according to claim 4, wherein the elongated member, at its one end, is arranged with the first gripping unit and, at its other end, is arranged with the second gripping unit, the elongated member extending in the same longitudinal direction as the said first beam unit, such that the elongated member can simultaneously pick a first object at its one end from the first position and a second object at its other end from the intermediate storage.

6. The method according to claim 1, wherein, between the first and second workstation, an intermediate table is arranged for intermediate storage of the work object.

7. An apparatus for transferring work objects in both horizontal and vertical directions between a first workstation and a second workstation, comprising:
a first beam unit disposed between the first workstation and the second workstation, wherein the first beam unit is essentially horizontal, wherein the first workstation is disposed beyond a first end of the first beam unit, the second workstation is disposed beyond a second end of the first beam unit, and an intermediate station is disposed between the first workstation and the second workstation;
a slide movably mounted on the first beam unit, wherein the slide has at least two deflection rollers, wherein the slide defines a vertical opening, and wherein the slide comprises a first pair of opposing guide rollers on a first side of the vertical opening and a second pair of opposing guide rollers on a second side of the vertical opening opposite to the first side of the vertical opening;
a second beam unit that is essentially perpendicular to the first beam unit and is movably mounted on the slide, wherein a first end of the second beam unit has at least one deflection roller, wherein the second beam unit moves vertically within the vertical opening, and wherein the first and second pairs of opposing guide rollers contact the second beam unit;
a gripping mechanism mounted on a second end of the second beam unit that is opposite the first end, wherein the gripping mechanism includes a first gripping unit and a second gripping unit spaced apart from each other, wherein the first gripping unit is adapted to pick up a first work object from the first workstation while the second gripping unit simultaneously picks up a second work object from the intermediate station, and wherein the first gripping unit is adapted to release the first work object at the intermediate station while the second gripping unit simultaneously releases the second work object at the second workstation;
at least two stationary drive motors; and
a belt member routed around the at least two deflection rollers on the slide and the at least one deflection roller on the second beam unit, wherein the belt member is attached at its two ends to the second end of the second beam unit, and wherein the belt member is driven by the at least two stationary drive motors, such that the belt member displaces the slide along the first beam unit and raises and lowers the second beam unit,
wherein the belt member is disposed in between the first and second pairs of opposing guide rollers.

8. The apparatus of claim 7, wherein, when the second beam unit is viewed in cross section, the first pair of opposing guide rollers contacts a first distal end of the second beam unit and the second pair of opposing guide rollers contacts a second distal end of the second beam unit opposite to the first distal end.

9. The apparatus of claim 7, wherein the second beam unit is an I-beam having a first flange and a second flange, wherein the first pair of opposing guide rollers contacts the first and second flanges, and wherein the second pair of opposing guide rollers contacts the first and second flanges.

10. The apparatus of claim 9, wherein, when the second beam unit is viewed in cross section, a roller of the first pair of opposing guide rollers contacts a first distal end of the first flange and wherein a roller of the second pair of opposing guide rollers contacts a second distal end of the first flange opposite to the first distal end.

11. The apparatus of claim 7, wherein the gripping mechanism is unobstructed by the apparatus in the horizontal direction.

12. A method for rapidly transferring a work object in both horizontal and vertical directions, the method comprising:
providing a robot unit having a gripping mechanism;
providing a first workstation and a second workstation between which to transfer the work object, the work object weighing between one kilo and forty kilos, and the transfer in the horizontal direction being at least one meter but less than ten meters and at least partially being effected along an essentially horizontally extending beam;
arranging the gripping mechanism such that, at least in a first end situation along the beam, the gripping mechanism can collect the work object in a first position situated beyond the first end situation along the beam,
controlling the robot unit with a control unit;
driving the robot unit with a belt member and at least two motors having rotor units connected to drive wheels for the belt member;
immovably arranging the at least two motors in relation to the first and second workstations;
effecting transfer of the work object without displacement of either of the at least two motors;
executing the entire transfer of the work object along the beam;
providing the belt member as a single continuous drive belt, which, at the same time, is connected to and driven by the drive wheels; and
guiding the transfer of the work object along a preprogrammed path using a control computer in the control unit, through continuous control and registration of the situation of each of the rotor units of the motors,
wherein the gripping mechanism moves along the beam and is arranged with at least two gripping units, a first gripping unit collecting the work object from the first position and a second gripping unit depositing the work object in a second position beyond a second end situation along the beam, each of the first and second gripping units collecting and placing objects simultaneously with the other unit,
wherein an intermediate storage for change of place of the work object is effected before the work object is transferred from the first position to the second position,
wherein the first gripping unit collects the work object from the first position and deposits the work object at the intermediate storage, and the second gripping unit collects the work object from the intermediate storage and deposits the work object in the second position, and
wherein transfer of the work object in the horizontal direction is unobstructed by the robot unit,
the robot unit comprising:

a first beam unit extending between two end points and the first and the second workstation, wherein the first beam unit is the essentially horizontally extending beam;

a slide which is arranged movably along the first beam unit, wherein the slide defines a vertical opening, and wherein the slide comprises a first pair of opposing guide rollers on a first side of the vertical opening and a second pair of opposing guide rollers on a second side of the vertical opening opposite to the first side of the vertical opening;

a second beam unit which extends essentially perpendicular to the first beam unit and which is arranged movably on the slide, wherein the second beam unit moves vertically within the vertical opening, and wherein the first and second pairs of opposing guide rollers contact the second beam unit;

the gripping mechanism arranged on one end of the second beam unit, wherein the gripping mechanism includes the first and a second gripping unit, the units capable of simultaneously picking up separate objects; and the at least two drive motors, which are connected to the control unit, a number of deflection rollers, and the belt member, wherein the belt member is in the form of a single continuous drive belt which runs around the drive wheels of the drive motors and the deflection rollers and is fastened to the one end of the second beam unit, and wherein the gripping mechanism reaches end points placed beyond the two end points of the horizontal beam, and wherein the control unit is connected to an operator panel through which the control computer in the control unit can continuously be re-programmed by manually controlling the gripping mechanism to move into chosen situations, wherein the slide further comprises:
 a third pair of opposing guide rollers on the first side of the vertical opening in the same vertical plane as the first pair of opposing guide rollers and vertically offset from the first pair of opposing guide rollers; and
 a fourth pair of opposing guide rollers on the second side of the vertical opening in the same vertical plane as the second pair of opposing guide rollers and vertically offset from the second pair of opposing guide rollers,
 wherein the third and fourth pairs of opposing guide rollers contact the second beam unit.

13. An apparatus for transferring work objects in both horizontal and vertical directions between a first workstation and a second workstation, comprising:

a first beam unit disposed between the first workstation and the second workstation, wherein the first beam unit is essentially horizontal, wherein the first workstation is disposed beyond a first end of the first beam unit, the second workstation is disposed beyond a second end of the first beam unit and an intermediate station is disposed between the first workstation and the second workstation;

a slide movably mounted on the first beam unit wherein the slide has at least two deflection rollers, wherein the slide defines a vertical opening, and wherein the slide comprises a first pair of opposing guide rollers on a first side of the vertical opening and a second pair of opposing guide rollers on a second side of the vertical opening opposite to the first side of the vertical opening;

a second beam unit that is essentially perpendicular to the first beam unit and is movably mounted on the slide, wherein a first end of the second beam unit has at least one deflection roller, wherein the second beam unit moves vertically within the vertical opening, and wherein the first and second pairs of opposing guide rollers contact the second beam unit;

a gripping mechanism mounted on a second end of the second beam unit that is opposite the first end, wherein the gripping mechanism includes a first gripping unit and a second gripping unit spaced apart from each other, wherein the first gripping unit is adapted to pick up a first work object from the first workstation while the second gripping unit simultaneously picks up a second work object from the intermediate station, and wherein the first gripping unit is adapted to release the first work object at the intermediate station while the second gripping unit simultaneously releases the second work object at the second workstation;

at least two stationary drive motors; and a belt member routed around the at least two deflection rollers on the slide and the at least one deflection roller on the second beam unit, wherein the belt member is attached at its two ends to the second end of the second beam unit, and wherein the belt member is driven by the at least two stationary drive motors, such that the belt member displaces the slide along the first beam unit and raises and lowers the second beam unit, wherein the slide further comprises:
 a third pair of opposing guide rollers on the first side of the vertical opening in the same vertical plane as the first pair of opposing guide rollers and vertically offset from the first pair of opposing guide rollers; and
 a fourth pair of opposing guide rollers on the second side of the vertical opening in the same vertical plane as the second pair of opposing guide rollers and vertically offset from the second pair of opposing guide rollers,
 wherein the third and fourth pairs of opposing guide rollers contact the second beam unit.

* * * * *